United States Patent
Zhao et al.

(10) Patent No.: US 9,444,382 B2
(45) Date of Patent: *Sep. 13, 2016

(54) OPTIMIZED FIELD ORIENTED CONTROL STRATEGIES FOR PERMANENT MAGNET SYNCHRONOUS MOTORS

(71) Applicant: Infineon Technologies AG, Neubiberg (DE)

(72) Inventors: Tao Zhao, Singapore (SG); Arno Rabenstein, Singapore (SG); Theng Kiong Gan, Singapore (SG); Choon Keat Kok, Singapore (SG); Sze Main Wong, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 78 days.

This patent is subject to a terminal disclaimer.

(21) Appl. No.: 14/168,187

(22) Filed: Jan. 30, 2014

(65) Prior Publication Data

US 2014/0210387 A1 Jul. 31, 2014

Related U.S. Application Data

(60) Provisional application No. 61/758,759, filed on Jan. 30, 2013.

(51) Int. Cl.
*H02P 21/00* (2016.01)
*H02P 21/06* (2016.01)

(52) U.S. Cl.
CPC .................................... *H02P 21/06* (2013.01)

(58) Field of Classification Search
CPC . H02P 21/0035; H02P 21/146; Y02T 10/643

USPC ............................. 318/727, 599, 811, 400.02
See application file for complete search history.

(56) References Cited

U.S. PATENT DOCUMENTS

| | | | |
|---|---|---|---|
| 5,467,000 A * | 11/1995 | Bauer | H02P 21/0035 318/432 |
| 5,714,857 A * | 2/1998 | Mannel | H02P 25/022 318/432 |
| 6,388,419 B1 * | 5/2002 | Chen | B60L 11/14 318/727 |
| 6,838,860 B2 * | 1/2005 | Huggett | H02J 3/1842 322/28 |

(Continued)

OTHER PUBLICATIONS

Infineon Technologies AG "XE 166 Family: Application Note." Published Jul. 2009. 41 Pages.

(Continued)

*Primary Examiner* — Rina Duda
(74) *Attorney, Agent, or Firm* — Eschweiler & Associates, LLC

(57) ABSTRACT

A motor control system and associated method includes a transform component configured to receive current values associated with a motor being driven by the motor control system, and output rotating coordinate system values representing a flux generating component and a torque generating component of a current space vector. The motor control system and method further includes a control component configured to receive the flux generating component and the torque generating component of the current space vector, and generate motor control signals for driving the motor by performing a Cartesian to polar transform to obtain values associated with a rotating coordinate system followed by an angle addition to convert the rotating coordinate system values to values of a stationary coordinate system.

10 Claims, 10 Drawing Sheets

(56) References Cited

U.S. PATENT DOCUMENTS

| | | | | |
|---|---|---|---|---|
| 6,940,251 B1* | 9/2005 | Sarlioglu | ............... | H02P 21/00 318/400.34 |
| 7,075,264 B2* | 7/2006 | Huggett | ............. | H02P 21/0042 318/363 |
| 7,659,685 B2* | 2/2010 | Cesario | ................ | G05B 13/04 318/568.13 |
| 7,733,677 B2* | 6/2010 | Cheng | ................ | H02M 1/4233 363/127 |
| 7,821,145 B2* | 10/2010 | Huang | .................... | F02N 11/04 290/31 |
| 2004/0062062 A1* | 4/2004 | Lee | .................... | H02P 21/0092 363/37 |
| 2010/0001669 A1* | 1/2010 | Olomski | ............... | H02P 21/146 318/400.06 |

OTHER PUBLICATIONS

Musil, Jaroslay. "Sensorless Sinusoidal PMSM Gas Compressor on MC56F80xx." Freescale Semiconductor. Published Sep. 2011. 11 Pages.

Akin, et al. "Sensorless Field Oriented Control of 3-Phase Permanent Magnet Synchronous Motors." Texas Instruments. Published Mar. 2011. 42 Pages.

Renesas. Three Shunt Sensorless Vector Control of PMSM Motors: RX62T Application Note. Published Nov. 18, 2011. 23 Pages.

Zambada, et al. "Sensorless Field Oriented Control of a PMSM." Microchip Technology Inc. Published Mar. 2010. 28 Pages.

Cheles, Mihai. "Sensorless Field Oriented Control (FOC) for a Permanent Magnet Synchronous Motor (PMSM) Using a PLL Estimator and Field Weakening (FW)." Microchip Technology Inc. Published Sep. 2009. 20 Pages.

ST. "Digital PFC and dual FOC MC integration." Published Jul. 2010. 31 Pages.

Microsemi. "Field Oriented Control of Permanent Magnet Synchronous Motors User's Guide." Published Jun. 2012. 43 Pages.

Fujitsu. "32-Bit Microcontroller Phased Lock Loop." Published Jul. 4, 2011. 16 Pages.

U.S. Appl. No. 14/168,144, filed Jan. 30, 2014. 36 Pages.

Non Final Office Action Dated Sep. 9, 2015 U.S. Appl. No. 14/168,144.

Final Office Action Dated Feb. 8, 2016 U.S. Appl. No. 14/168,144.

Notice of Allowance dated Jun. 29, 2016 for U.S. Appl. No. 14/168,144.

* cited by examiner

US 9,444,382 B2

OPTIMIZED FIELD ORIENTED CONTROL STRATEGIES FOR PERMANENT MAGNET SYNCHRONOUS MOTORS

BACKGROUND

Field oriented control (FOC) is increasingly being used in consumer and industrial PMSM control for fans, pumps, compressors, geared motors, etc. To further increase energy efficiency at the lowest cost, more and more new functions (e.g., digital power conversion, digital power factor correction (PFC), FOC control of multiple motors in air-con) need to be handled by one single microcontroller. But existing FOC control strategies are complicated and processor-intensive, impeding more microcontroller power from being allocated to those complex new system functions.

For highly dynamic loading (e.g., motors for electric propulsion, compressors), a fast and accurate FOC control loop is needed to control motor currents and voltages to consistently maintain maximum efficiency. But existing FOC has complex transformations in the critical control loop, making it inaccurate and relatively slow.

New microcontrollers include more and more features and peripherals (e.g., human machine interface (HMI), communications) in order to excel in the intensely fierce competition. However, existing FOC control strategies tend to overburden the microcontrollers, hindering the full use of their potential and features in complex applications with FOC motor controls.

DETAILED DESCRIPTION

Figure 1A:
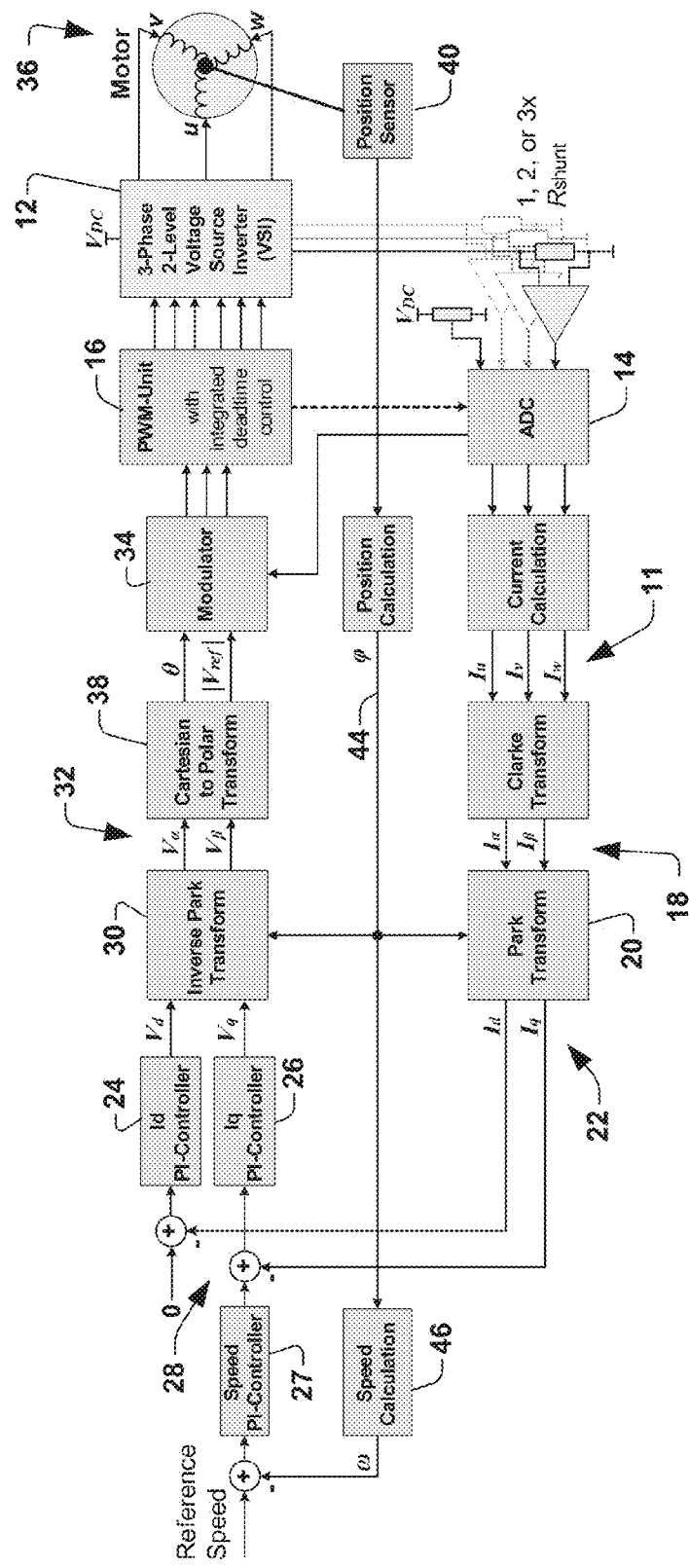
FIG. 1A is a schematic diagram illustrating a conventional sensored FOC control strategy.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one skilled in the art, that one or more aspects described herein may be practiced with a lesser degree of these specific details. In other instances, known structures and devices are shown in block diagram form to facilitate understanding.

To address some of the above mentioned shortcomings, the present disclosure proposes optimized sensored and sensorless FOC control strategies without a computation-intensive Inverse Park Transform. The new control strategies have an optimized and faster control loop, and decreased CPU time utilization. In complex applications with FOC motor control, the new strategies will boost the performance of the microcontrollers and the whole system.

The existing FOC transforms three phase signals into two rotor-fix signals and vice-versa with complex Cartesian reference frame transformations (e.g., Park Transform and Inverse Park Transform) in the control loop which is supposed to be fast. These reference frame transformations are computation-intensive and are inclined to introduce extra calculation errors, resulting in a slow current control loop and a poor response to dynamic motor loads, and make it difficult to handle more composite system functions (e.g., digital PFC, multiple FOC motor controls, digital power conversion) with only one single microcontroller.

Figure 1B:
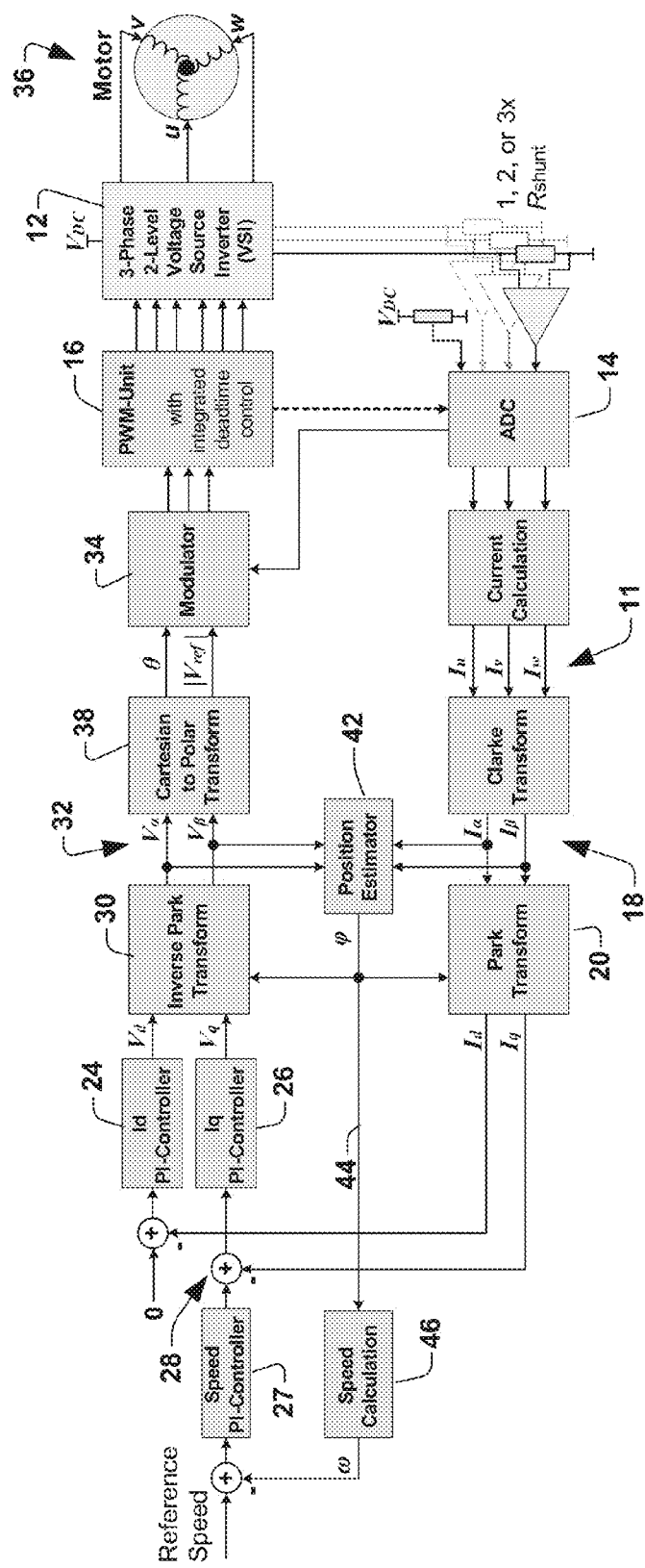
FIG. 1B is a schematic diagram illustrating a conventional sensorless FOC control strategy.

FIGS. 1A and 1B are two examples of existing FOC control strategies that can be used as benchmarks for proposed optimized FOC control strategies. A detailed description of the existing FOC is provided below.

Normally, existing FOC for PMSMs uses a Clarke Transform to transform 3-phase currents $I_u$, $I_v$, and/or $I_w$ 11 measured by an analog to digital converter (ADC) 14 (ADC conversion can be triggered by a pulse width modulation (PWM) unit 16) to a stationary $\alpha$-$\beta$ reference frame as $I_\alpha$ and $I_\beta$ 18 (which are sinusoidal signals in steady state). Then a Park Transform 20 is used to transform $I_\alpha$ and $I_\beta$ 18 to another rotating d-q coordinate system as $I_d$ and $I_q$ 22, respectively. $I_d$ and $I_q$ are feedback signals of the FOC control loop and are almost constants at steady state. Proportional-integral (PI) controllers 24, 26, 27 are used for speed and current controls separately, to achieve controllable motor speed, torque and air gap flux. In general, the flux generating component $I_d$ is controlled to 0. It is also possible to control $I_d$ to negative values (i.e., a flux-weakening control) to extend the operating speed range of PMSMs. The speed PI controller 27 has an output 28 that provides the reference current for the torque generating component $I_q$. The current PI controllers 24, 26 output desired voltages $V_d$ and $V_q$ the motor phases should generate in the d-q reference frame. Here $V_d$ and $V_q$ are almost constants in steady state. An Inverse Park Transform 30 is used to transform resultant voltages $V_d$ and $V_q$ to the stationary α-β reference frame as $V_\alpha$ and $V_\beta$ 32, which are sinusoidal signals in steady state. The amplitude and angle of voltage vector ($V_\alpha$, $V_\beta$) are the reference voltage for the space vector modulator (SVM) 34, which is used for the control of the PWM unit 16 to create 3-phase waveform outputs from the 3-phase 2-level voltage inverter 12 to drive the motor phases uvw 36. The Cartesian to Polar Transform 38 can be neglected if the microcontroller is not good at such calculation, instead the voltages $V_\alpha$ and $V_\beta$ are sent to the SVM modulator 34 directly. The ADC value of the inverter DC link voltage $V_{DC}$ (normally a voltage divider is needed) is also obtained regularly for SVM calculations.

The rotor position is obtained from a rotor position sensor 40 (such as an encoder, a resolver, Hall sensors, etc.) for sensored FOC, or a position estimator for sensorless FOC (see FIG. 1B). The rotor position 44 and speed calculations 46, and the speed PI controller 27 constitute the slow control loop as the motor mechanical time constant is typically much larger than the electrical time constant. The other computing blocks shown in FIGS. 1A and 1B comprise the fast current control loop and should be computed as fast as possible.

The present disclosure proposes optimized sensored and sensorless FOC control strategies without an Inverse Park Transform to solve the above-mentioned problems. Table 1 compares the mathematical transformations used in conventional FOC and the proposed new FOC control strategies.

The new FOC control strategies use magnitude and angle to represent the voltage space vector in polar coordinate systems, so that the complex Inverse Park Transform with sine and cosine functions, which are crucial in conventional FOC, can be replaced by a simple addition of angles while keeping the space vector magnitudes unchanged. The addition of angles can be computed precisely and instantly (an addition operation can be done within only one, or a few system clocks with current microcontrollers). It will be shown below that the addition of angles consumes almost zero CPU time if using a controller such as, for example, Infineon microcontrollers with CORDIC coprocessors.

Without the Inverse Park Transform, the system can optimize and speed-up the FOC fast control loop, which will benefit the FOC motor control with highly dynamic loading (such as a compressor or motor for electric propulsion). It also reduces CPU load and saves precious CPU time for other purposes (e.g., digital PFC, multiple FOC motor drive, HMI, communications) in sophisticated systems, hence the microcontroller's potential and features can be used sufficiently. Conversely, with optimized FOC, users could select a microcontroller with less computation power and lower cost to accomplish FOC motor controls of the same quality.

It is worth noting that the transformations solving vector magnitudes and arctangent functions for the new FOC are well suited for many microcontrollers, for example, Infineon microcontrollers with hardware CORDIC coprocessors to achieve decreased CPU time utilization. The new FOC control strategies efficiently use the advantages of CORDIC coprocessors and showcase the prominent features of Infineon microcontrollers.

TABLE 1

Mathematical transformations in conventional FOC and proposed new FOC

| Transformation | For Conventional FOC | For Proposed New FOC |
|---|---|---|
| uvw to α-β Transform | Clarke Transform:<br>$I_\alpha = I_u$<br>$I_\beta = (I_u + 2I_v)/\sqrt{3}$<br>$(I_u + I_v + I_w = 0)$<br>In matrix form:<br>$\begin{bmatrix} I_\alpha \\ I_\beta \end{bmatrix} = \begin{bmatrix} 1 & 0 \\ 1/\sqrt{3} & 2/\sqrt{3} \end{bmatrix} \begin{bmatrix} I_u \\ I_v \end{bmatrix}$ | Same as conventional FOC |
| Stationary coordinate system to rotating coordinate system Transform | Park Transform:<br>$I_d = I_\alpha \cos(\phi) + I_\beta \sin(\phi)$<br>$I_q = -I_\alpha \sin(\phi) + I_\beta \cos(\phi)$<br>In matrix form:<br>$\begin{bmatrix} I_d \\ I_q \end{bmatrix} = \begin{bmatrix} \cos(\varphi) & \sin(\varphi) \\ -\sin(\varphi) & \cos(\varphi) \end{bmatrix} \begin{bmatrix} I_\alpha \\ I_\beta \end{bmatrix}$ | Same as conventional FOC |
| Rotating coordinate system to stationary coordinate system Transform | Inverse Park Transform:<br>$V_\alpha = V_d \cos(\phi) - V_q \sin(\phi)$<br>$V_\beta = V_d \sin(\phi) + V_q \cos(\phi)$<br>In matrix form:<br>$\begin{bmatrix} V_\alpha \\ V_\beta \end{bmatrix} = \begin{bmatrix} \cos(\varphi) & -\sin(\varphi) \\ \sin(\varphi) & \cos(\varphi) \end{bmatrix} \begin{bmatrix} V_d \\ V_q \end{bmatrix}$ | Addition of angles:<br>$\theta = \Theta + \phi \ (\pm 2n\pi)$<br>where<br>$\theta = \arctan\left(\frac{V_\beta}{V_\alpha}\right)$<br>$\Theta = \arctan\left(\frac{V_q}{V_d}\right)$ |

φ – Rotor position/angle
n = 0, ±1, ±2, ±3, or ... *
Magnitude maintains, i.e.:

$$|V_{ref}| = \sqrt{V_\alpha^2 + V_\beta^2} = \sqrt{V_d^2 + V_q^2}$$

TABLE 1-continued

Mathematical transformations in conventional FOC and proposed new FOC

| Transformation | For Conventional FOC | For Proposed New FOC |
|---|---|---|
| Cartesian to Polar Transform | $\|V_{ref}\| = \sqrt{V_\alpha^2 + V_\beta^2}$<br>$\theta = \arctan\left(\dfrac{V_\beta}{V_\alpha}\right)$ | $\|V_{ref}\| = \sqrt{V_d^2 + V_q^2}$<br>$\Theta = \arctan\left(\dfrac{V_q}{V_d}\right)$ |
| Polar to Cartesian Transform | Not used | For sensorless FOC only:<br>$V_\alpha = \|V_{ref}\|\cos(\theta)$<br>$V_\beta = \|V_{ref}\|\sin(\theta)$ |

Note
* Mathematically n can be any integers. Usually select only one n (e.g.: n = 0)

One aspect of the disclosure, i.e., optimized sensored and sensorless FOC control strategies for PMSM, is the manipulation of the voltage space vector in polar coordinate systems so that Inverse Park Transform, which is essential for conventional FOC, can be replaced by simple addition of angles. Note the voltage space vector magnitudes in the stationary and rotating coordinate systems are the same. Without an Inverse Park Transform, the fast control loop of FOC is optimized. If one uses Infineon microcontrollers with CORDIC coprocessors, for example, more optimizations for the proposed new FOC control strategies can be implemented.

In the disclosure below, proposed new FOC control strategies are highlighted with a detailed description of FOC coordinate systems, space vectors, PI controller, SVM, rotor position determination, and CORDIC of the new FOC control strategies.

Figure 2A:
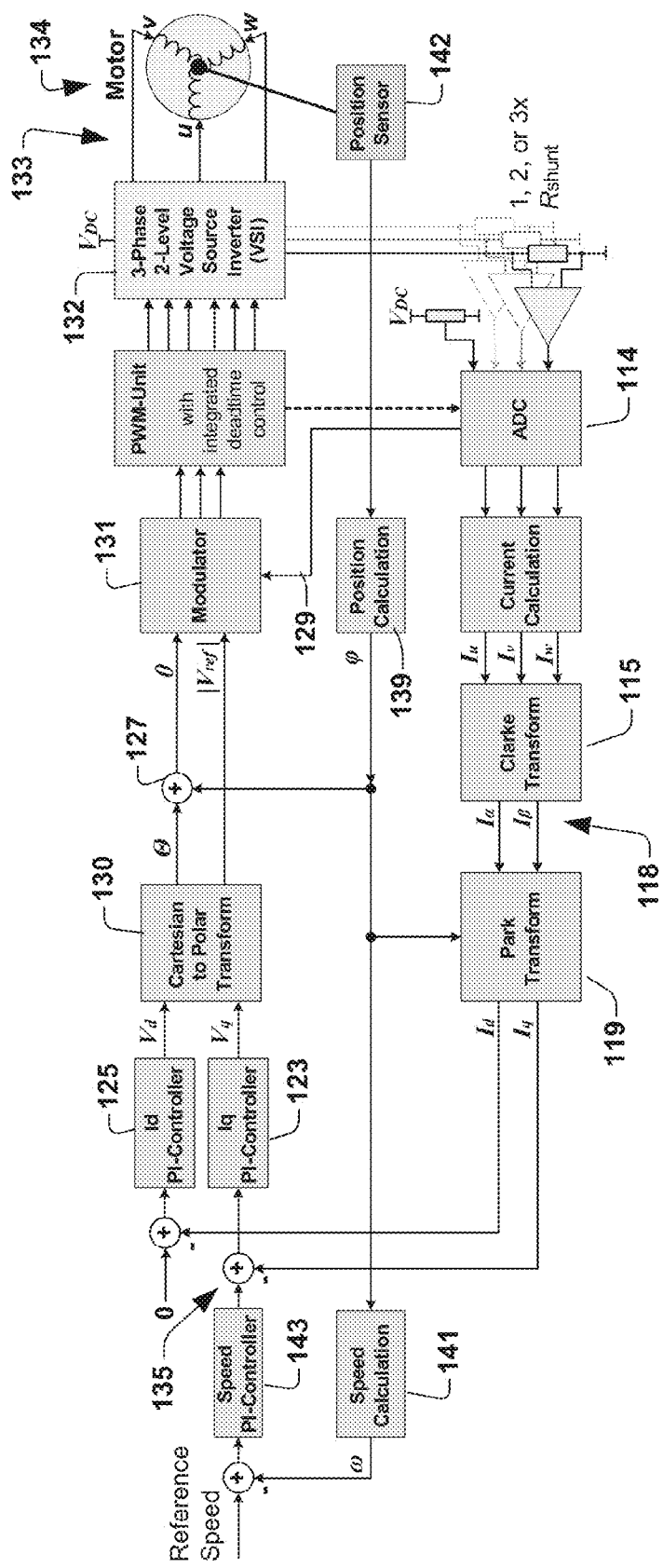
FIG. 2A is a schematic diagram illustrating an optimized sensored FOC control strategy for PMSM in accordance with one embodiment of the disclosure.
Figure 2B:
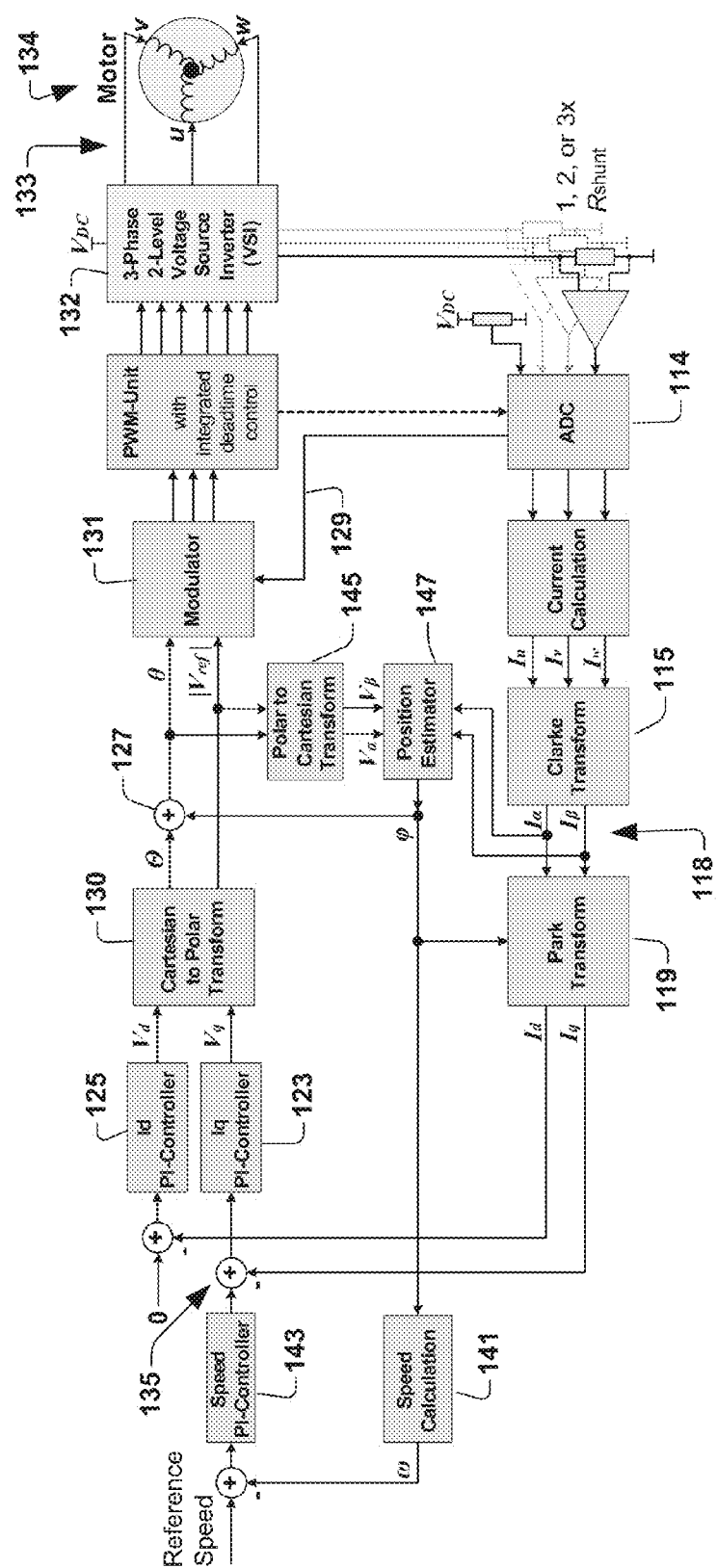
FIG. 2B is a schematic diagram illustrating an optimized sensorless FOC control strategy for PMSM in accordance with another embodiment of the disclosure.

New sensored and sensorless FOC without an Inverse Park Transform are shown in FIGS. 2A-2B. In the new control strategies shown in FIGS. 2A-2B, after ADC conversions 114 and Clarke Transform 115 to get currents $I_\alpha$ and $I_\beta$ 118, a Park Transform 119 is used to transform the currents $I_\alpha$ and $I_\beta$ to the rotor d-q coordinate system to obtain $I_d$ and $I_q$. To obtain maximum torque and power efficiency, $I_q$ and $I_d$ PI controllers 123 and 125 are used to control the flux generating component $I_d$ and the torque generating component $I_q$ of the voltage space vector, respectively to make the stator flux space vector perpendicular to the rotor magnetic field (i.e., forces $I_d$ to 0). In general, the flux generating component $I_d$ is controlled to 0. It is also possible to control $I_d$ to negative values (i.e., a flux-weakening control) to extend the operating speed range of PMSMs.

Table 2 lists the equations of the transformations used. Compared to conventional FOC, an addition of angles $\theta=\Theta+\phi$ replaces the Inverse Park Transform, so the fast current control loop becomes more simple and hence faster. Also, in sensorless FOC a Polar to Cartesian Transform is used in the slow control loop to generate $V_\alpha$ and $V_\beta$ for the position estimator. The Polar to Cartesian Transform can also be omitted in one embodiment for position estimators that need the magnitude $\|V_{ref}\|$ and angle $\theta$ of the voltage space vector as input signals. Other parts of the optimized FOC control strategies are almost the same as the conventional FOC described supra.

TABLE 2

Mathematical transformations for new FOC without Inverse Park Transform

| Transformation | Equations |
|---|---|
| Clarke Transform | $I_\alpha = I_u$<br>$I_\beta = (I_u + 2I_v)/\sqrt{3}$<br>$(I_u + I_v + I_w = 0)$ |
| Park Transform | $I_d = I_\alpha \cos(\phi) + I_\beta \sin(\phi)$<br>$I_q = -I_\alpha \sin(\phi) + I_\beta \cos(\phi)$ |
| Cartesian to Polar Transform, and Addition of Angles | $\|V_{ref}\| = \sqrt{V_d^2 + V_q^2}$<br>$\Theta = \arctan\left(\dfrac{V_q}{V_d}\right)$<br>$\theta = \Theta + \varphi$ |
| Polar to Cartesian Transform (for sensorless FOC only) | $V_\alpha = \|V_{ref}\|\cos(\theta)$<br>$V_\beta = \|V_{ref}\|\sin(\theta)$ |

The speed PI controller output 135 is the reference for the $I_q$ PI controller 123. The rotor position 139 and speed calculations 141 from a position sensor 142, speed PI control 143 are the slow control loop. Note that in sensorless control as shown in FIG. 2B, a Polar to Cartesian Transform 145 is used in the slow control loop to generate $V_\alpha$ and $V_\beta$ for a position estimator 147. The other computing blocks shown in FIG. 2B are part of the fast stator flux control loop.

A simple addition of angles $\theta=\Theta+\phi$ at 127 accomplishes the transformation from the rotating coordinate system back to the stationary coordinate system, doing the same job of an Inverse Park Transform 30 of existing FOC (see FIG. 1A). The magnitude $\|V_{ref}\|$ and angle $\theta$ of the voltage space vector, together with the inverter DC link voltage information 129, are sent to SVM 131 to control the inverter 132 output 133 for the motor 134.

To provide the highest performance for both sensored and sensorless FOC as shown in FIGS. 2A-2B, two calculations: 1) Cartesian to Polar Transform 130 to get magnitude $\|V_{ref}\|$ and angle $\Theta$, and 2) addition of angles $\theta=\Theta+\phi$ at 127, can be computed with one single CORDIC calculation if using an Infineon microcontroller with CORDIC coprocessor, for example, at the same time the CPU can do other computations. That is to say both calculations consume almost no CPU time.

To speed-up the fast current control loop and save CPU time, the Park Transform 119 can also be calculated according to one embodiment by a CORDIC coprocessor of an Infineon microcontroller, while the CPU performs other computations of the system.

For sensorless FOC as illustrated in FIG. 2B, the Polar to Cartesian Transform 145 to get $V_\alpha$ and $V_\beta$ for the position estimator 147 can be computed by the CORDIC coprocessor of an Infineon microcontroller, furthermore, it can be calculated concurrently when the CPU is computing for the SVM modulator to improve FOC control loop speed. The Polar to Cartesian Transform 145 can also be done with one look-up table for a sine function from 0 to 90° in microcontroller memory. The look-up table can be re-used by the SVM modulator 131, i.e., to calculate Equations (6) and (7) discussed later below, so the memory usage is maximally optimized.

Figure 3:
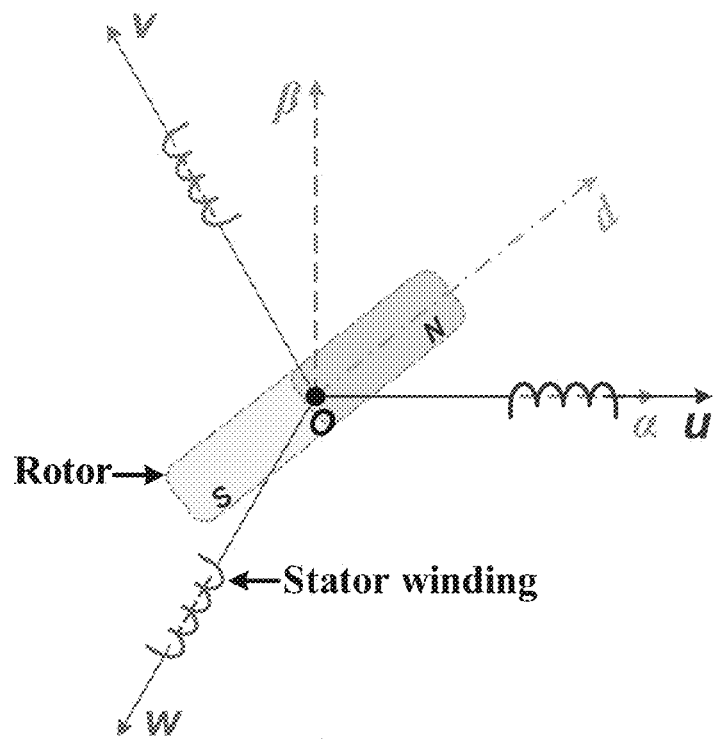
FIG. 3 is a diagram illustrating a coordinate system for a 3-phase 2-pole PMSM motor in accordance with one embodiment of the disclosure.

The coordinate systems of a 3-phase 2-pole PMSM motor for FOC are shown below in Table 3 and FIG. 3. d-q and Od synchronous reference frames are fixed to the rotor and rotating together, with their Od axes in the direction from the rotor permanent magnet south pole (S) to north pole (N).

TABLE 3

Coordinate systems new FOC control strategies

| Coordinate System | | Stationary | Rotating |
|---|---|---|---|
| 3-phase (electrically 120° separated) | uvw | ✓ | |
| Cartesian (electrically orthogonal) | α-β | ✓ | |
| | d-q | | ✓ |
| Polar | Ou | ✓ | |
| | Od | | ✓ |

Figure 4:
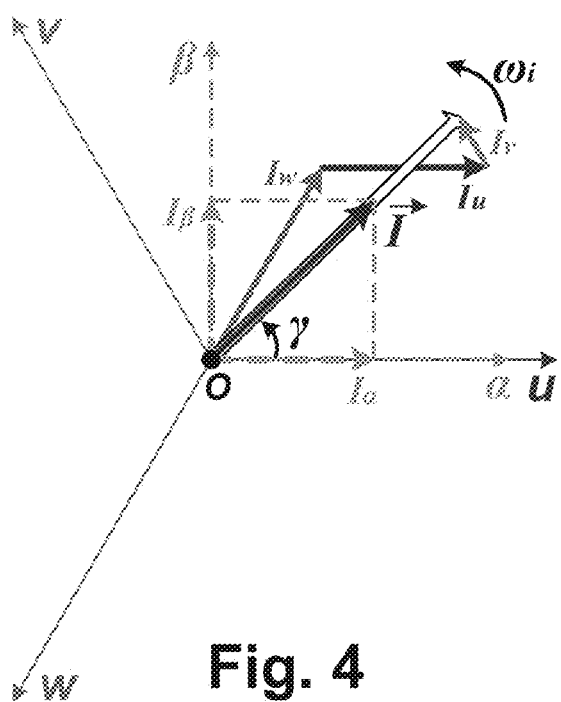
FIG. 4 is a diagram illustrating a coordinate system wherein vector addition of current gives a current space vector having Cartesian coordinates in accordance with one embodiment of the disclosure.
Figure 5:
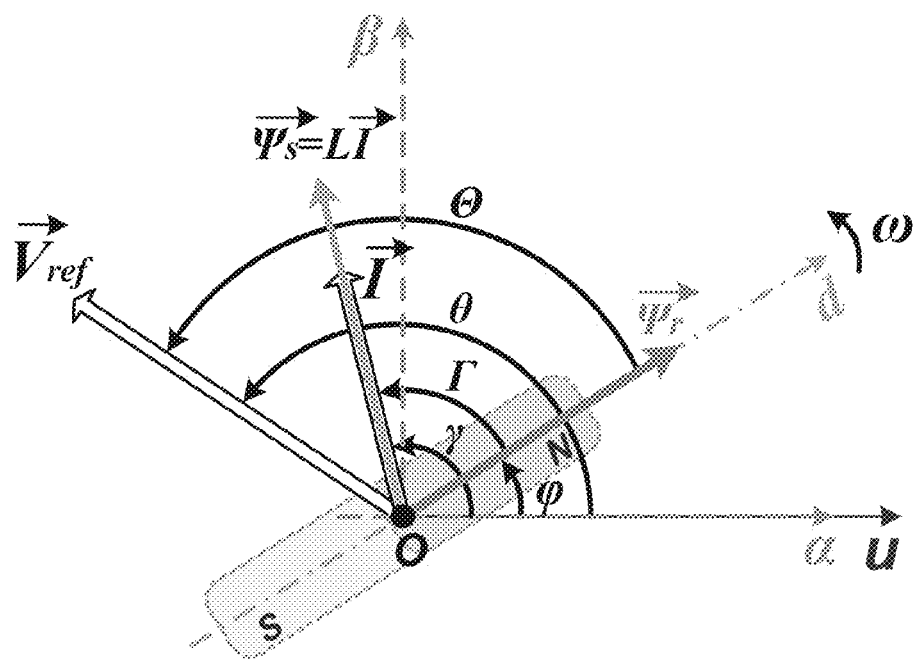
FIG. 5 is a diagram illustrating a coordinate system in which a rotating stator flux space vector that represents the rotating stator magnetic flux is illustrated in accordance with one embodiment of the disclosure.

3-phase 120° separated currents $I_u$, $I_v$ and $I_w$ of motor stator windings will generate three non-rotating but pulsating magnetic fields in u, v and w directions respectively, resulting in a rotating magnetic field (stator flux space vector). Coincidently, vector addition of $I_u$, $I_v$ and $I_w$ gives a current space vector $\vec{I}$ (its magnitude can be scaled down or up but no change of direction) rotating at speed $\omega_i$. In stationary α-β reference frame, $\vec{I}$ has Cartesian coordinates $I_\alpha$ and $I_\beta$, as shown in FIG. 4. The rotating stator flux space vector $\vec{\Psi}_s$ has the same direction of $\vec{I}$ with their magnitudes proportional to each other, as shown in FIG. 5. To control the rotating stator flux, it is easy to control only one current space vector $\vec{I}$ instead of three currents $I_u$, $I_v$ and $I_w$.

Similarly, vector addition of 3-phase 120° separated stator phase voltages gives a rotating voltage space vector. Also, rotating rotor permanent magnet generates a rotating rotor magnetic flux space vector.

One advantage of the optimized sensored and sensorless FOC control strategies of FIGS. 2A-2B is the manipulation of the voltage space vector in polar coordinate systems. FIG. 5 shows the coordinates of the voltage space vector in the stationary and rotating polar coordinate systems, together with other space vectors. The coordinates of above-mentioned space vectors in different coordinate systems are given in the following Table 4.

TABLE 4

Coordinates of space vectors for optimized FOC control strategies

| | | Coordinates in Different Coordinate Systems | | | |
|---|---|---|---|---|---|
| Space Vector | uvw | α-β | d-q | Ou | Od |
| $\vec{I}$ | $I_u, I_v, I_w$ | $I_\alpha, I_\beta$ | $I_d, I_q$ | — | — |
| $\vec{V}_{ref}$ | $V_u, V_v, V_w$ | $V_\alpha, V_\beta$ | $V_d, V_q$ | $\|V_{ref}\|, \theta$ | $\|V_{ref}\|, \Theta$ |
| $\vec{\Psi}_s$ | $LI_u, LI_v, LI_w$ | $LI_\alpha, LI_\beta$ | $LI_d, LI_q$ | — | — |
| $\vec{\Psi}_r$ | — | $\psi_{r\alpha}, \psi_{r\beta}$ | $\psi_r, 0$ | — | — | where: $\vec{I}$—Stator current space vector $\vec{V}_{ref}$—Stator voltage space vector $\vec{\Psi}_s$—Stator magnetic flux space vector, $\vec{\Psi}_s = L\vec{I}$ L—Stator winding inductance per phase $\vec{\Psi}_r$—Rotor permanent magnet(s) flux space vector. Its magnitude $\Psi_r$ can be derived from voltage constant, speed constant or torque constant in motor specifications φ—Rotor electrical position Θ—Angle of voltage space vector in rotating Od polar coordinate system θ—Angle of voltage space vector in stationary Ou polar coordinate system, θ=Θ+φ

Figure 6:
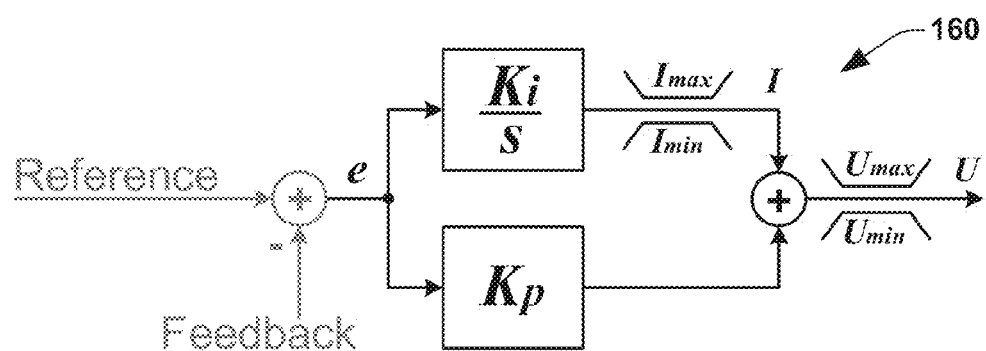
FIG. 6 is a schematic diagram illustrating a PI controller for controlling a rotor speed, a flux generating component $I_d$ and a torque generating component $I_q$ of a current space vector in accordance with one embodiment of the disclosure.

PI controllers are used for the rotor speed, $I_d/I_q$ current controls. A PI controller is a special case of the PID controller in which the derivative of the error is not used. A PI controller 160 is shown in FIG. 6 and its equation is $$U(t) = K_p e(t) + \underbrace{K_i \int_0^t e(\tau)d\tau}_{I(t)} \quad (1)$$

where: e—error signal, it is reference value minus feedback value $K_p$—Proportional gain $K_i$—Integral gain t—Instantaneous time T—Variable of integration; takes on values from time 0 to the present time t.

I(t)—Integral term

U(t)—Controller output

A digital implementation of it in a microcontroller can be $$I(k)=K_i e(k)+I(k-1) \quad (2)$$

$$U(k)=K_p e(k)+I(k) \quad (3)$$

Both I and U in Equations (2) and (3) have minimum and maximum limits to avoid the unwanted windup situation (anti-windup).

Figure 7:
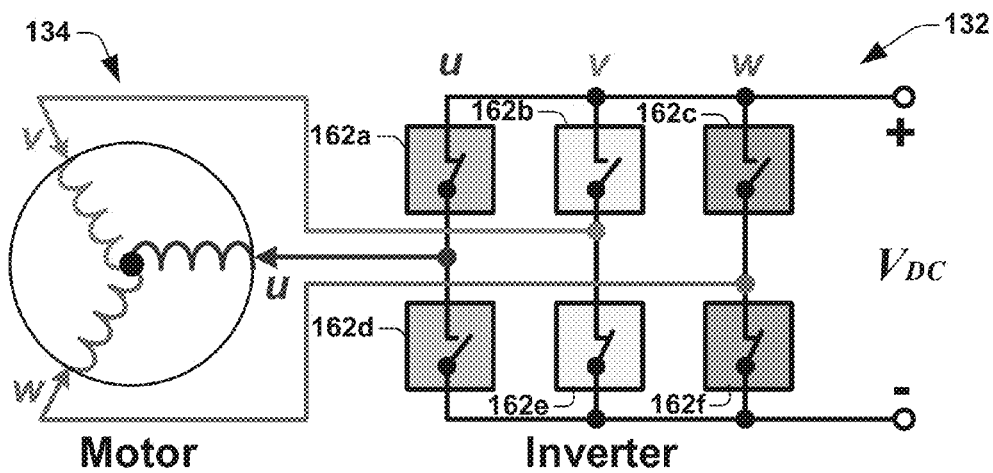
FIG. 7 is a schematic diagram illustrating a 3-phase 2-level inverter circuit for driving a motor in accordance with one embodiment of the disclosure.

The connection of a 3-phase 2-level voltage source inverter 132 and a motor 134 are shown in FIG. 7. The six switching devices 162a-162f of the inverter 132, which could be MOSFET, IGBT or similar parts, are controlled by microcontroller PWM signals. The motor windings can be wired in a star (as shown) or a delta. SVM is used to control the PWM to create 3-phase waveforms to the motor windings.

Figure 8:
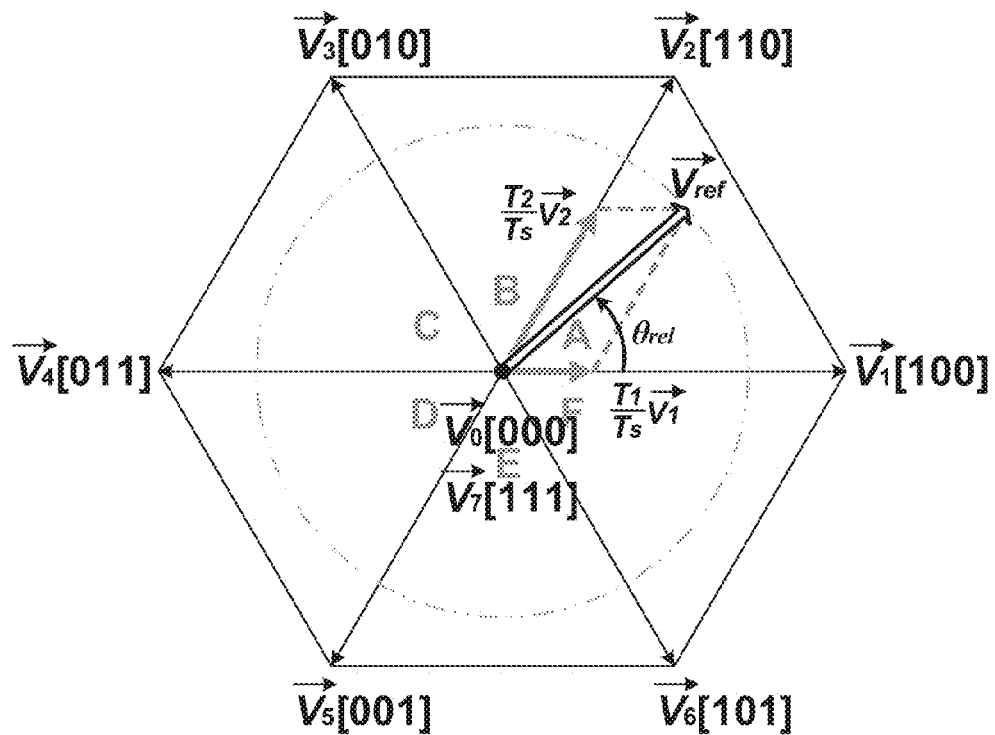
FIG. 8 is a space vector diagram illustrating the possible switching voltage vectors, both active and passive vectors, in accordance with one embodiment of the disclosure.

To avoid short-circuit of DC link voltage, the inverter has only eight possible switching voltage vectors as shown in the following FIG. 8. $\vec{V}_1$ to $\vec{V}_6$ are active vectors, $\vec{V}_0$ and $\vec{V}_7$ do not generate any voltage difference in three motor phases and are passive vectors (or zero vectors). The rotating voltage space vector $\vec{V}_{ref}$ is approximated by two adjacent active vectors (e.g., $\vec{V}_1$, $\vec{V}_2$ in Sector A) and one or both of the passive vectors (e.g., $\vec{V}_0$ only). The plane is dissected in six sectors from A to F and the angle θ of $\vec{V}_{ref}$ is transformed into the relative angle $\theta_{ref}$ in each sector. $T_1$, $T_2$ and $T_0$ correspond with the active vectors and passive vector(s), respectively (e.g.: $\vec{V}_1$, $\vec{V}_2$, and $\vec{V}_0$ in Sector A).

Using the voltage space vector in Sector A as an example, the following shows the calculation. Using volt second balancing:

$$\vec{V}_{ref} = \frac{T_0}{T_S}\vec{V}_0 + \frac{T_1}{T_S}\vec{V}_1 + \frac{T_2}{T_S}\vec{V}_2 \qquad (4)$$

$$T_S = T_0 + T_1 + T_2 \qquad (5)$$

Solving the equation we have $$T_1 = \frac{\sqrt{3}\,|V_{ref}|T_S}{V_{DC}}\sin\left(\frac{\pi}{3} - \theta_{rel}\right) \qquad (6)$$

$$T_2 = \frac{\sqrt{3}\,|V_{ref}|T_S}{V_{DC}}\sin(\theta_{rel}) \qquad (7)$$

$$T_0 = T_S - T_1 - T_2 \qquad (8)$$

where: $T_s$—Sampling period $T_0$—Time of zero vector(s) is applied. The zero vector(s) can be $\vec{V}_0[000]$, $\vec{V}_7[111]$, or both $T_1$—Time of active vector $\vec{V}_1$ is applied within one sampling period $T_2$—Time of active vector $\vec{V}_2$ is applied within one sampling period $V_{DC}$—Inverter DC link voltage Equations (6) and (7) can be calculated with different methods, e.g., use a look-up table for a sine function from 0 to 60° in microcontroller memory, or be calculated by the CORDIC coprocessor of an Infineon microcontroller, etc.

There are many SVM schemes (e.g., symmetrical or asymmetrical 7-segment schemes, symmetrical or asymmetrical 5-segment scheme, and 3-segment scheme) that result in different quality and computational requirements. SVM scheme can be selected based on microcontroller features and application requirements.

In sensored FOC, the position sensor (such as encoder, resolver, Hall sensors, etc) provides the information of rotor position. In sensorless FOC, the rotor position can be extracted from rotor magnetic flux (to be elaborated below), BEMF, position estimator with PLL structure, or others.

Figure 9A:
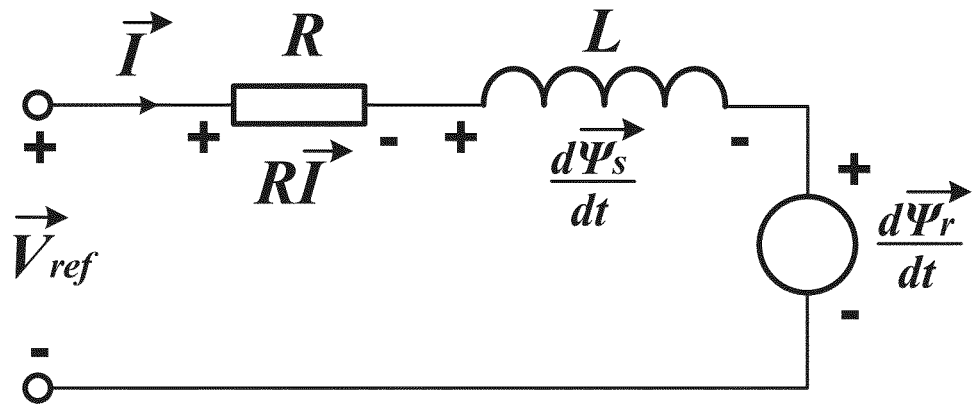
FIG. 9A is a schematic diagram illustrating an equivalent circuit of the electric subsystem of a PMSM in accordance with one embodiment of the disclosure.

An equivalent circuit of the electrical subsystem of a PMSM is shown in FIG. 9A. The motor equation is:

$$\vec{V}_{ref} = R\vec{I} + \frac{d\vec{\Psi}_s}{dt} + \frac{d\vec{\Psi}_r}{dt} \qquad (9)$$

where: R—Stator winding resistance per phase $R\vec{I}$—Voltage drop on the stator winding resistor L—Stator winding inductance per phase $d\vec{\Psi}_s/dt$—Electromotive force induced by time-varying stator magnetic flux, $$\frac{d\vec{\Psi}_s}{dt} = \frac{d\vec{I}}{dt}$$

$d\vec{\Psi}_r/dr$—Electromotive force induced by rotating and hence time-varying rotor magnetic flux.

Figure 9B:
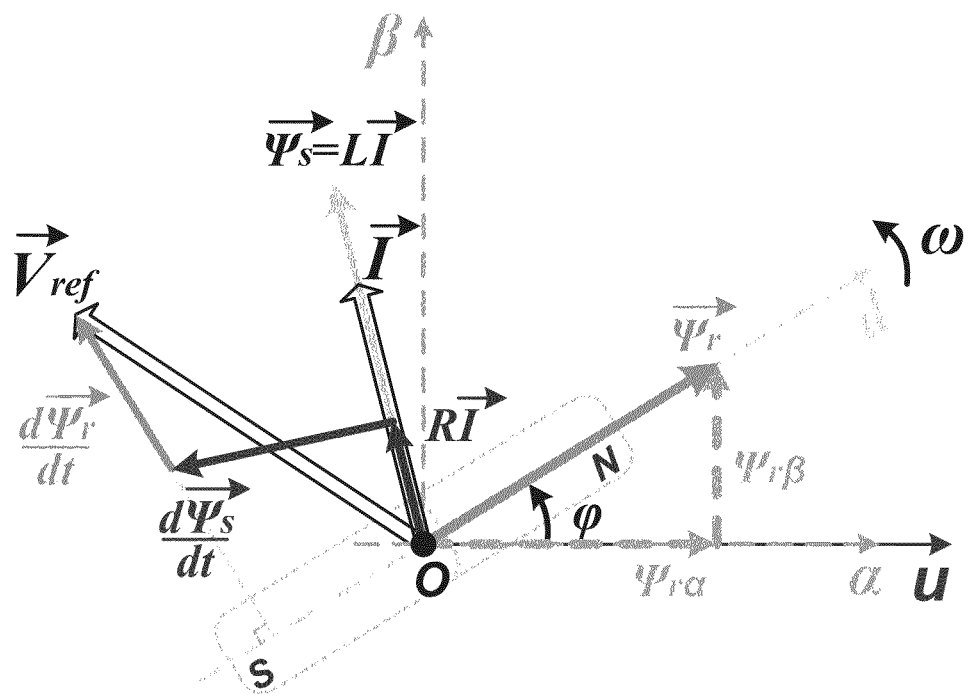
FIG. 9B is a diagram illustrating a coordinate system with the terms of a motor equation illustrated thereon in accordance with one embodiment of the disclosure.

All the terms of Equation (9) are depicted in FIG. 9B. Integrating the equation and rearrange, we get $$\vec{\Psi}_r = \int_0^t (\vec{V}_{ref} - R\vec{I})dt - L\vec{I} \qquad (10)$$

Project both sides of Equation (10) to stationary α-β axes to get the coordinates of rotor flux space vector $$\Psi_{r\alpha} = \int_0^t (V_\alpha - RI_\alpha)dt - LI_\alpha \qquad (11)$$

$$\Psi_{r\beta} = \int_0^t (V_\beta - RI_\beta)dt - LI_\beta \qquad (12)$$

$I_\alpha$ and $I_\beta$ are real-time measured and calculated current values. $V_\alpha$ and $V_\beta$ are last control cycle calculation results and presently applying to the motor phases. The integrations shown in Equations (11) and (12) can be simplified by replacing the integrations by low pass filters with a very low cut-off frequency. So the rotor position can be calculated by knowing the motor parameters R and L. The flux position estimator is $$\varphi = \arctan\left(\frac{\Psi_{r\beta}}{\Psi_{r\alpha}}\right) \qquad (13)$$

The rotor electrical speed is $$\omega = \frac{d\varphi}{dt} \qquad (14)$$

The proposed optimized FOC control strategies are well suited for Infineon microcontrollers that have hardware CORDIC coprocessors, e.g., 8-bit microcontrollers XC83x, XC88x and XC87x, and 32-bit microcontrollers XMC130x. The following Table 5 gives examples of CORDIC computations that could be used in the optimized FOC control strategies.

TABLE 5

Computations with CORDIC coprocessors of Infineon microcontrollers

CORDIC Coprocessor

| Operating Modes | Initial Data | Final Result Data | Computations for New FOC Control Strategies |
|---|---|---|---|
| Vectoring Mode | X<br>Y<br>Z | $X_{final} = K\sqrt{X^2 + Y^2}/MPS$<br>$Y_{final} = 0$<br>$Z_{final} = Z + \arctan\left(\frac{Y}{X}\right)$<br>where K ≈ 1.64676<br>MPS - X and Y magnitude prescaler, e.g.: MPS = 1, 2, or 4, depending on microcontroller register setting<br>1). To solve the Cartesian to Polar Transform, set $X = V_d/K$, $Y = V_q/K$, $Z = 0$.<br>2). Set $Z = \phi$ to calculate Cartesian to Polar Transform and angle addition with one single CORDIC calculation | Cartesian to Polar Transform:<br>$\|V_{ref}\| = \sqrt{V_d^2 + V_q^2}$<br>$\Theta = \arctan\left(\frac{V_q}{V_d}\right)$<br>Addition of Angles:<br>$\theta = \Theta + \phi$ |
| Rotation Mode | X<br>Y<br>Z | $X_{final} = K[X\cos(Z) - Y\sin(Z)]/MPS$<br>$Y_{final} = K[Y\cos(Z) + X\sin(Z)]/MPS$<br>$Z_{final} = 0$<br>where K ≈ 1.64676<br>MPS - X and Y magnitude prescaler, e.g.: MPS = 1, 2, or 4, depending on microcontroller register setting<br>1). To solve the Park Transform, set $X = I_\beta/K$, $Y = I_\alpha/K$, $Z = \phi$.<br>2). To solve the Polar to Cartesian Transform, set $X = \|V_{ref}\|/K$, $Y = 0$, $Z = 0$ | Park Transform:<br>$I_d = I_\alpha\cos(\phi) + I_\beta\sin(\phi)$<br>$I_q = -I_\alpha\sin(\phi) + I_\beta\cos(\phi)$<br>Polar to Cartesian Transform:<br>$V_\alpha = \|V_{ref}\|\cos(\theta)$<br>$V_\beta = \|V_{ref}\|\sin(\theta)$ |

For sensorless FOC as shown in FIG. 2B, the voltage $V_\alpha$ and $V_\beta$ can also be calculated from $V_d$ and $V_q$ from PI controllers 123, 125 using an Inverse Park Transform 150, but put the Inverse Park Transform 150 in the slow control loop for rotor position estimation, as shown below in FIG. 10.

Figure 10:
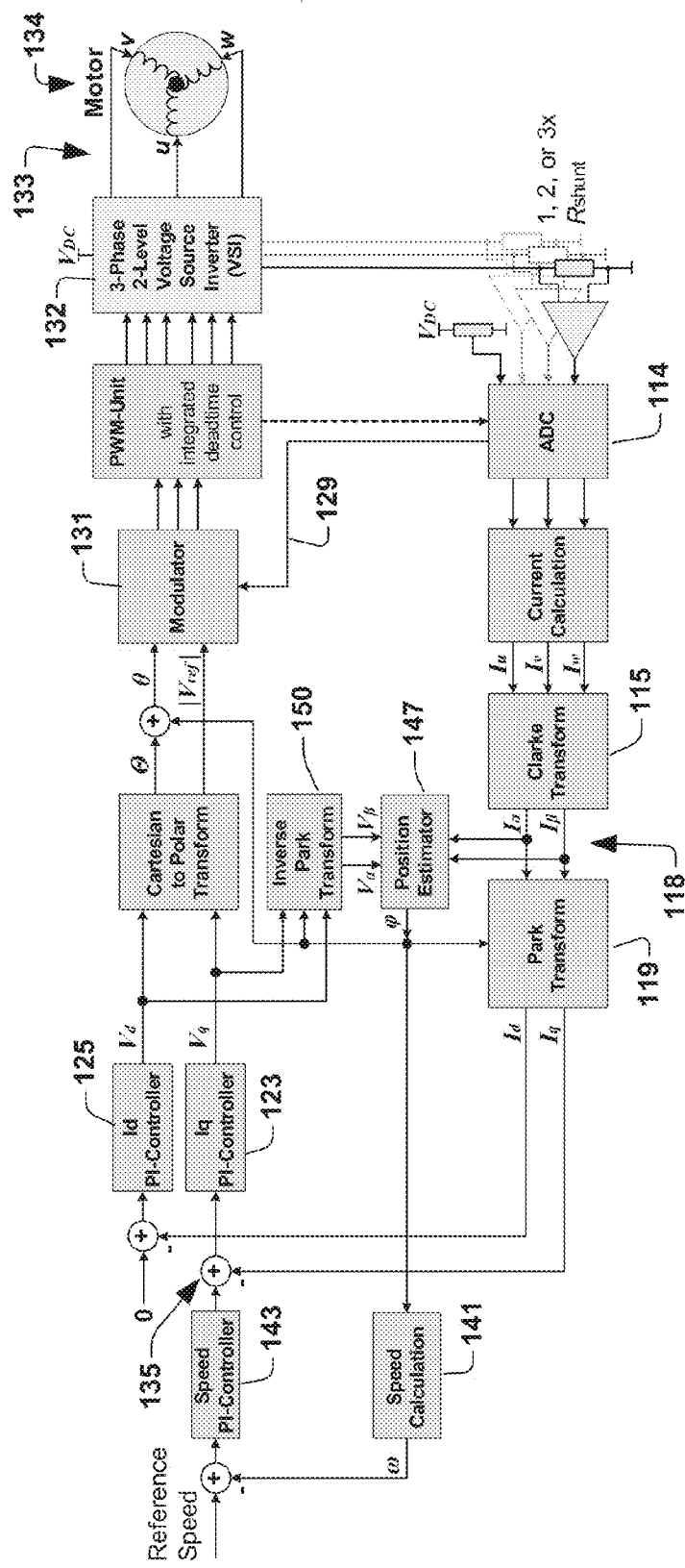
FIG. 10 is a schematic diagram illustrating an optimized sensorless FOC control strategy with Inverse Park Transform for PMSM in accordance with another embodiment of the disclosure.

This new FOC control strategy of FIG. 10 has improved fast control loop compared to the conventional FOC as shown in FIG. 1B. To further increase the calculation speed, the Inverse Park Transform 150 can be calculated by the CORDIC coprocessor of an Infineon microcontroller at the same time when the CPU is computing for the SVM modulator 131. Such usage highlights the advantageous features of controllers such as Infineon microcontrollers, for example.

For the new sensored FOC without Inverse Park Transform as shown in FIG. 2A, the current variables $I_\alpha$ and $I_\beta$ are inessential, implying that we could bypass the Clarke Transform 115. Combining the mathematical expressions in matrix form for the Clarke Transform 115 and the Park Transform 119 from Table 1, we have $$\begin{bmatrix} I_d \\ I_q \end{bmatrix} = \begin{bmatrix} \cos(\varphi) & \sin(\varphi) \\ -\sin(\varphi) & \cos(\varphi) \end{bmatrix} \begin{bmatrix} 1 & 0 \\ 1/\sqrt{3} & 2/\sqrt{3} \end{bmatrix} \begin{bmatrix} I_u \\ I_v \end{bmatrix} \quad (15)$$

Simplifying the equation we can get a new uvw to d-q Transform 160 as shown below $$\begin{bmatrix} I_d \\ I_q \end{bmatrix} = K_1 \begin{bmatrix} \cos(\varphi - \frac{\pi}{6}) & \sin(\varphi) \\ -\sin(\varphi - \frac{\pi}{6}) & \cos(\varphi) \end{bmatrix} \begin{bmatrix} I_u \\ I_v \end{bmatrix} \quad \text{or} \quad (16)$$

$$\begin{bmatrix} I_d \\ I_q \end{bmatrix} = K_1 \begin{bmatrix} \sin(\varphi + \frac{\pi}{3}) & \sin(\varphi) \\ \cos(\varphi + \frac{\pi}{3}) & \cos(\varphi) \end{bmatrix} \begin{bmatrix} I_u \\ I_v \end{bmatrix} \quad (17)$$

where: $K_1$—Scaling factor and $K_1 = 2/\sqrt{3}$, which can be neglected here (i.e., make $K_1 = 1$). The scaling factor $2/\sqrt{3}$ can be combined with other scaling factors of the control strategy (e.g., current sensing and amplification, analog-to-digital conversion, etc).

Figure 11:
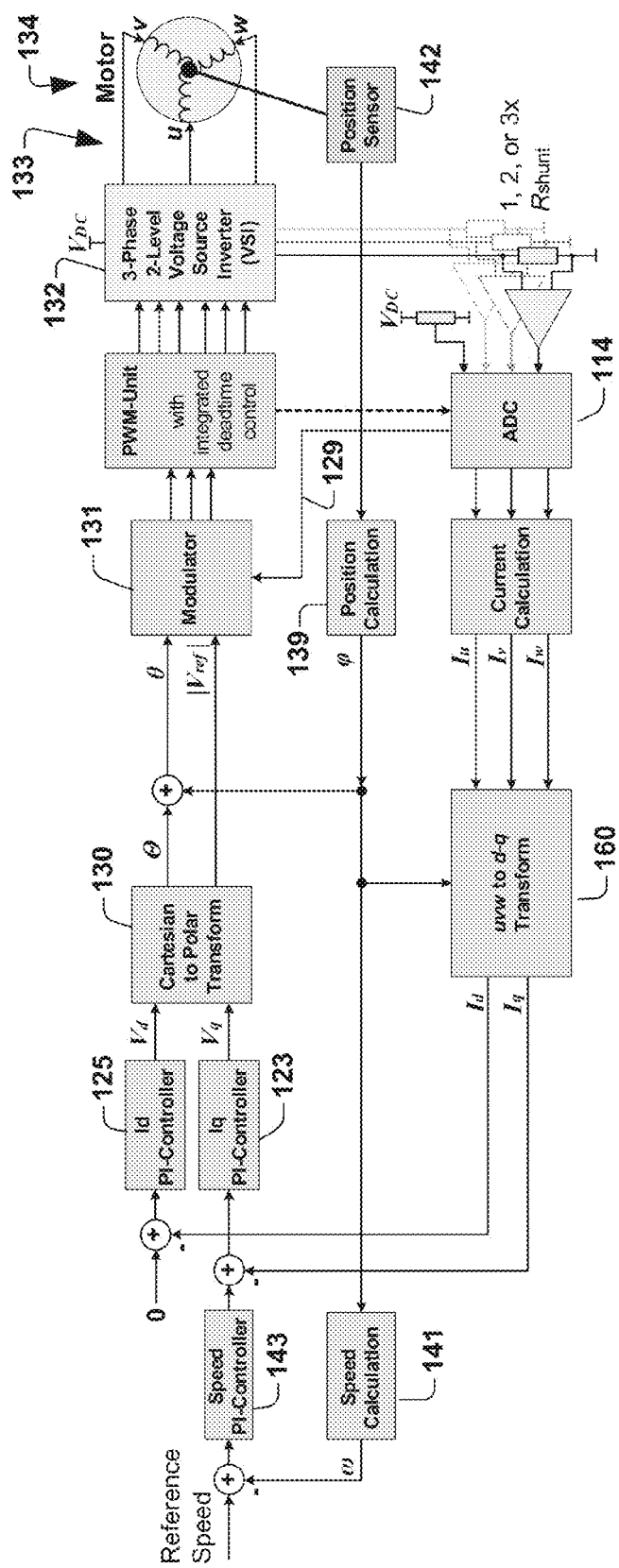
FIG. 11 is a schematic diagram illustrating an optimized sensored FOC control strategy with direct uvw to d-q transform without Clarke Transform for PMSM in accordance with another embodiment of the disclosure.

If a look-up table for sine functions is employed in one embodiment, the calculation time for one single new uvw to d-q Transform 160 shown in Equation (16) or (17) will be shorter than the total execution time of the Clarke Transform 115 and the Park Transform 119 in FIG. 2A. A new FOC control strategy with a direct uvw to d-q Transform (i.e., without the Clarke Transform anymore) is shown below in FIG. 11.

It will be appreciated that equivalent alterations and/or modifications may occur to those skilled in the art based upon a reading and/or understanding of the specification and annexed drawings. For example, the above examples are discussed in the context of PMSM motors, but the present disclosure is equally applicable for sensored and sensorless FOC control for other AC motors such as Alternating Current Induction Motor (ACIM). The disclosure herein includes all such modifications and alterations and is generally not intended to be limited thereby.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

What is claimed is:

1. A motor control system, comprising:
    a transform component configured to receive current values associated with a motor being driven by the motor control system, and output rotating coordinate system values representing a flux generating component and a torque generating component of a current space vector, wherein the transform component comprises:
        a Clarke transform component configured to receive the current values associated with respective phases of the motor being drive, and convert the current values into a Cartesian space to obtain Cartesian current values; and
        a Park transform component configured to receive the Cartesian current values and convert such into the flux generating component and the torque generating component of the current space vector; and
    a control component configured to receive the flux generating component and the torque generating component of the current space vector, and generate motor control signals for driving the motor by performing a Cartesian to polar transform to obtain values associated with a rotating coordinate system followed by an addition with a position angle to convert the rotating coordinate system values to values of a stationary coordinate system to generate a voltage space vector, wherein the control component further comprises:
        a torque generating component controller configured to receive the torque generating component of the current space vector and a feedback control value associated with a speed value and a reference value, and generate a torque generating component of a voltage space vector based thereon, wherein the speed value is calculated from a position angle; and
    a position estimator component configured to generate the position angle employing the Cartesian current values from the Clarke transform component and Cartesian voltage values based on the voltage space vector output from the control component.

2. The motor control system of claim 1, wherein the control component further comprises:
    a flux generating component controller configured to receive the flux generating component and generate a flux generating component of the voltage space vector.

3. The motor control system of 2, wherein the control component further comprises a Cartesian to Polar Transform component configured to receive the flux generating component and the torque generating component of the voltage space vector and generate a magnitude component and an angle component of the voltage space vector in a rotating coordinate system.

4. The motor control system of claim 3, wherein the control component further comprises an addition component configured to add the position angle to the angle component of the voltage space vector to transform the voltage space vector from a rotating coordinate system to a stationary coordinate system.

5. The motor control system of claim 1, wherein the control component further comprises:
    a pulse width modulator configured to receive the control signals from the space vector modulator and generate pulse width modulation signals in response thereto for driving switches of the inverter.

6. The motor control system of claim 2, wherein the control component further comprises:
    an Inverse Park Transform component configured to receive the flux generating component and the torque generating component of the voltage space vector, and convert such components into Cartesian values of the flux generating component and the torque generating component; and
    a position estimation component configured to receive the Cartesian flux generating component and Cartesian torque generating component and calculate the position angle based thereon.

7. The motor control system of claim 1, wherein the transform component is configured to provide a direct transform from current values to flux generating component and torque generating component values of the current space vector.

8. A method of performing motor control, comprising:
    obtaining current values associated with a motor being driven by a control component, wherein the current values represent phases of a current space vector;
    determining a position angle of the motor being driven;
    transforming the current values to rotating coordinate values representing a flux generating component and a torque generating component of the current space vector, wherein transforming the current values to rotating coordinate values comprises:
        converting the current values into a Cartesian space comprising Cartesian current values;
        converting the Cartesian current values into the flux generating component and the torque generating component of the current space vector; and
        adjusting the torque generating component using a speed value based on the determined position angle, wherein the flux generating component and the adjusted torque generating component comprise a voltage space vector;
    transforming the flux generating component and the adjusted torque generating component of the voltage space vector into polar coordinate values;
    converting the polar coordinate values of the voltage space vector into Cartesian voltage values of the voltage space vector;
    using the Cartesian voltage values of the voltage space vector and the Cartesian current values in the determining of the position angle associated with the motor being driven; and
    using the polar coordinate values in generating control signals for the control component in controlling the motor being driven, wherein using the polar coordinate values in generating control signals further comprises adding the position angle to at least one of the polar coordinate values to transform the polar coordinate values from a rotating coordinate system to a stationary coordinate system.

9. The method of claim 8, wherein using the polar coordinate values in generating control signals further comprises:
- receiving the flux generating component and the adjusted torque generating component of the voltage space vector; and
- generating a magnitude of the voltage space vector based thereon.

10. The method of claim 8, wherein transforming the current values to rotating coordinate values comprises converting the current values directly into the rotating coordinate values.

* * * * *